United States Patent
Wagner et al.

(10) Patent No.: US 12,455,865 B2
(45) Date of Patent: Oct. 28, 2025

(54) METHOD FOR GENERATING TRAINING DATASETS FOR TRAINING AN EVALUATION ALGORITHM, METHOD FOR TRAINING AN EVALUATION ALGORITHM AND METHOD FOR EVALUATING AN ALIGNMENT OF TWO MAP DATASETS

(71) Applicant: Robert Bosch GmbH, Stuttgart (DE)

(72) Inventors: Andre Wagner, Hannover (DE); Hans-Georg Raumer, Hildesheim (DE); Max Kirstein, Hohenhameln-Ot Bruendeln (DE); Thomas Wenzel, Hamburg (DE); Thorben Funke, Sarstedt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/936,450

(22) Filed: Nov. 4, 2024

(65) Prior Publication Data

US 2025/0147938 A1 May 8, 2025

(30) Foreign Application Priority Data

Nov. 8, 2023 (DE) ...................... 10 2023 211 084.9

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2365* (2019.01); *G06F 16/258* (2019.01); *G06F 16/29* (2019.01)

(58) Field of Classification Search
None
See application file for complete search history.

(56) References Cited

U.S. PATENT DOCUMENTS 10,346,429 B2 * 7/2019 Jacob .................... G06F 16/258
10,592,508 B2 * 3/2020 Srivastava .......... G06F 16/2358
(Continued)

FOREIGN PATENT DOCUMENTS

EP 3875908 A1 9/2021

OTHER PUBLICATIONS

Torroba et al., "PointNetKL: Deep Inference for GICP Covariance Estimation in Bathymetric SLAM", IEEE Robotics and Automation Letters, Jul. 2020, vol. 5, No. 3, pp. 4078-4085.
(Continued)

*Primary Examiner* — Hasanul Mobin
(74) *Attorney, Agent, or Firm* — NORTON ROSE FULBRIGHT US LLP (57) ABSTRACT

A method for generating training datasets for training an evaluation algorithm using which an alignment of two map datasets can be evaluated to determine navigation information for a mobile device that is moving or is to move in an environment. The method includes, for each of a plurality of training datasets: providing two input feature datasets, wherein underlying map datasets each contain environmental information that has been acquired using a sensor of the mobile device; providing a transformation dataset generated during an alignment of the two input feature datasets; providing a reference transformation dataset as ground truth; determining a correlation dataset based on the two input feature datasets and/or the transformation dataset; determining a quality measure depending on an accuracy of a match between the transformation dataset and the reference transformation dataset; and providing the training dataset which includes the correlation dataset and the quality measure.

14 Claims, 5 Drawing Sheets

(51) Int. Cl.
   *G06F 16/23*   (2019.01)
   *G06F 16/25*   (2019.01)
   *G06F 16/29*   (2019.01)

(56) References Cited

U.S. PATENT DOCUMENTS

| | | | | |
|---|---|---|---|---|
| 2010/0061591 | A1* | 3/2010 | Okada | G08G 1/167 |
| | | | | 382/103 |
| 2016/0275667 | A1* | 9/2016 | Modica | G01S 17/06 |
| 2020/0012662 | A1* | 1/2020 | Walters | G06T 7/194 |
| 2020/0110774 | A1* | 4/2020 | Lakshmanan | G06N 3/08 |
| 2020/0303078 | A1* | 9/2020 | Mayhew | G06N 20/10 |
| 2021/0390141 | A1* | 12/2021 | Jacob | G06F 9/3877 |
| 2021/0397589 | A1* | 12/2021 | Griffith | G06F 16/2365 |
| 2022/0058745 | A1* | 2/2022 | Crabtree | G06N 20/00 |
| 2022/0101526 | A1* | 3/2022 | Lerch | G16H 50/20 |
| 2023/0350648 | A1* | 11/2023 | Guo | G06F 3/0482 |
| 2023/0351211 | A1* | 11/2023 | Nath | G06Q 30/01 |
| 2024/0357409 | A1* | 10/2024 | Marquezan | H04W 24/10 |
| 2025/0028730 | A1* | 1/2025 | Fluty | G06F 16/2379 |
| 2025/0147938 | A1* | 5/2025 | Wagner | G06F 16/258 |

OTHER PUBLICATIONS

Maken et al., "Estimating Motion Uncertainty with Bayesian ICP", 2020 IEEE International Conference on Robotics and Automation (ICRA), May 31, 2020-Aug. 31, 2020, Paris, France, pp. 8602-8608.

Maken et al., "Stein ICP for Uncertainty Estimation in Point Cloud Matching", IEEE Robotics and Automation Letters, Apr. 2022, vol. 7, No. 2, pp. 1063-1070.

C. Choy, W. Dong, and V. Koltun, "Deep global registration," in Proceedings of the IEEE/CVF conference on computer vision and pattern recognition, pp. 2514-2523, 2020.

C. Choy, J. Park, and V. Koltun, "Fully convolutional geometric features," in Proceedings of the IEEE/CVF International Conference on Computer Vision, pp. 8958-8966, 2019.

* cited by examiner

METHOD FOR GENERATING TRAINING DATASETS FOR TRAINING AN EVALUATION ALGORITHM, METHOD FOR TRAINING AN EVALUATION ALGORITHM AND METHOD FOR EVALUATING AN ALIGNMENT OF TWO MAP DATASETS

FIELD

The present invention relates to a method for generating training datasets for training an evaluation algorithm by means of which an alignment of two map datasets can be evaluated in order to determine navigation information for a mobile device that is moving or is to move in an environment, to a method for training such an evaluation algorithm, to a method for evaluating an alignment of two map datasets, to a mobile device, and to a system and a computer program for carrying out the methods.

BACKGROUND INFORMATION

Mobile devices, such as vehicles or robots that move in an at least partially automated manner, typically move in an environment such as a home, in a garden, on a factory floor or on the road, in the air or in water. One of the fundamental problems of such or any other mobile device is to navigate and, in particular, to orient itself, i.e., to know what the environment looks like, in particular where obstacles or other objects are, and where it is located (in absolute terms). For this purpose, the mobile device can, for example, be equipped with various sensors, such as cameras, lidar sensors, radar sensors or even inertial sensors or GNSS sensors (generalization of GPS sensors, for coarse positioning), with the aid of which the environment and the movement of the mobile device can be acquired, for example, in two or three dimensions.

SUMMARY

According to the present invention, a method for generating training datasets for training an evaluation algorithm, a method for training an evaluation algorithm, and a method for evaluating an alignment of two map datasets, a mobile device and a system and a computer program for carrying out the methods are provided. Advantageous example embodiments of the present invention are disclosed herein.

The present invention is generally concerned with mobile devices that move or at least can move in an environment such as on a road or in a work area. Examples of such mobile devices (or mobile work equipment) are robots and/or drones and/or vehicles that move in a partially automated or (fully) automated manner (on land, in water or in the air). Examples of robots that can be considered are household robots such as cleaning robots (e.g., in the form of vacuum and/or mopping robots), floor- or street-cleaning devices, construction robots or lawnmower robots, but also other so-called service robots, as well as vehicles that move in an at least partially automated manner, e.g., passenger transport vehicles or goods transport vehicles (also so-called industrial trucks, e.g., in warehouses, but generally also passenger cars and trucks), but also aircraft such as so-called drones or watercraft.

Such a mobile device has in particular an open-loop or closed-loop control unit and a drive unit for moving the mobile device, so that the mobile device can be moved in the environment, e.g., along a movement path. For this purpose, navigation information can be determined, for example, specific instructions as to in which direction the mobile device should travel in order to follow the movement path. These can then be implemented via the open-loop or closed-loop control unit as well as the drive unit. This can be referred to generally as the navigation of the mobile device.

Moreover, a mobile device can have one or more sensors by means of which the environment or information in the environment and possibly also from the mobile device itself can be acquired. As mentioned, these can be, for example, cameras, lidar sensors, radar sensors, ultrasonic sensors or inertial measuring units (or inertial sensors) as well as a wheel odometry system, with the aid of which the environment and the movement of the mobile device are acquired, for example, in two or three dimensions. Depending on the type of mobile device, however, other or further sensors may also be provided.

One aspect of navigation is so-called mapping, which is used, for example, in the creation of maps of the environment. Such maps can also be used as sensors to a certain extent. This is also referred to as scan matching or map alignment. One aim here is to determine an aligning transformation between input data, which can come from any sensors, such as lane markings detected by a vehicle camera or radar echoes.

This transformation is usually a key first step in creating a consolidated map from multiple, partially overlapping sensor data (or a representation derived therefrom).

In general, this involves aligning two map datasets.

An example of this is also the scan matching of so-called point clouds from lidar sensors or point clouds from other sensors. In particular, the entire point cloud measured or acquired by the laser scanner or sensor is used; a point cloud is a set of points in the environment that are determined using the laser scanner or lidar sensor, for example. Each point can be assigned a distance from the mobile device or laser scanner, as well as an orientation relative to a reference orientation of the mobile device or laser scanner. The point cloud usually corresponds to one or more "point lines" along the contour of the objects in the field of view; however, the points may also lie only approximately on such a line.

However, this point cloud alone does not allow the position and/or orientation of the mobile device in the environment to be determined. For this purpose, the point cloud or set of points is compared with a reference point cloud or reference set of points. A transformation can then be determined that best brings the point cloud (or set of points) into congruence or coincidence with the reference point cloud (or reference set of points), i.e., aligns both with one another. This transformation then corresponds to a position and/or orientation of the mobile device when the point cloud is acquired relative to the reference point cloud or to a coordinate system of the reference point cloud. If the reference point cloud is a map of the environment or at least part of it, the current position and/or orientation of the mobile device in the environment can be determined. The reference point cloud (or map of the environment) can be expanded, for example, by constantly or repeatedly adding new point clouds or parts thereof.

This is also referred to as SLAM. SLAM ("simultaneous localization and mapping") is a method in robotics in which a mobile device such as a robot can or must simultaneously create a map of its environment and estimate its spatial position within this map. It is used, for example, to recognize obstacles and thus supports autonomous navigation.

On the basis of such a SLAM graph, a map of the environment (environment map) in which the mobile device moves can be or will be determined. With each new map dataset containing information about the environment and/or about the mobile device, which information is obtained from or based on one or more sensors of the mobile device, the map (or the SLAM graph) can be expanded or updated.

An attempt is made in the process to bring the two map datasets, i.e., an existing and a new map dataset, into coincidence, at least within certain tolerances, in order to determine the movement or trajectory of the mobile device.

In principle, the mapping process on the one hand and the localization process on the other hand can also have been decoupled from one another (i.e., the map is created, played out to the mobile device, which then locates itself in the map). Scan matching or the alignment of two map datasets can be used in both cases, i.e., combined or decoupled mapping and localization processes.

In general, an alignment of two map datasets can therefore be used to determine navigation information such as a map or a trajectory for a mobile device that is moving or is to move in an environment. This can be relevant in particular in the field of autonomous driving. For this purpose, two map datasets can be provided, each containing environmental information. In both of the two map datasets, the environmental information was collected from the mobile device and/or the environment by means of a sensor of the mobile device. However, the same sensor does not have to have been used for both map datasets. The two map datasets are provided as input feature data, or input feature data are determined on the basis of the two map datasets.

An alignment, i.e., a matching, of the two map datasets can then be carried out. In general, there are different approaches to this, both traditional and machine learning (ML)-based approaches, as described in C. Choy, W. Dong, and V. Koltun, "Deep global registration," in Proceedings of the IEEE/CVF conference on computer vision and pattern recognition, pp. 2514-2523, 2020." Many of these approaches use two steps: in the first step, so-called feature descriptors are generated, as described in C. Choy, J. Park, and V. Koltun, "Fully convolutional geometric features," in Proceedings of the IEEE/CVF International Conference on Computer Vision, pp. 8958-8966, 2019." The aligning transformation is then determined on the basis of these feature descriptors, often as a combination of traditional and ML methods.

The alignment or matching of the two map datasets is thus carried out in particular using a machine learning algorithm. In particular, a so-called convolutional neural network (CNN) is considered as a machine learning algorithm. Output data are generated from the input feature data via intermediate feature data (feature maps) in one or more intermediate layers (so-called hidden layers). The output data comprise information about a transformative relation (or simply a transformation) between the two map datasets.

Typically, such a transformative relation or transformation comprises a translation, represented, e.g., by a translation vector, and a rotation, represented, e.g., by a rotation matrix (both e.g., in 2D or in 3D depending on the situation). This applies in particular in the case of so-called FCGF-based scan matching methods, in which, for each point in the point clouds, a feature vector that encodes geometric properties of the point is specified. A feature dataset is therefore obtained for each map dataset (point cloud).

The alignment can be carried out, for example, by forming point-to-point correspondences on the basis of the feature datasets and by applying a correspondence-based point cloud registration method (e.g., RANSAC registration). However, point-to-point correspondences can also be formed on the basis of the feature datasets, and DGR can be applied.

A transformation dataset shall therefore also be referred to below instead of source data. The source data or transformation dataset and/or the underlying two map datasets can then be provided for use in determining the navigation information.

Machine learning algorithms or CNNs that can be considered are, for example, those described in C. Choy, W. Dong, and V. Koltun, "Deep global registration," in Proceedings of the IEEE/CVF conference on computer vision and pattern recognition, pp. 2514-2523, 2020." or in C. Choy, J. Park, and V. Koltun, "Fully convolutional geometric features," in Proceedings of the IEEE/CVF International Conference on Computer Vision, pp. 8958-8966, 2019.

However, it has now become apparent that this alignment does not always work equally well, i.e., such an alignment, which is ultimately a kind of estimate, can be good or poor. However, if the alignment is poor, navigation based on the transformation dataset or, if applicable, the two map datasets would produce poor results.

Against this background, a possibility for evaluating such an alignment of two map datasets using an evaluation algorithm is provided, as well as the training of such an evaluation algorithm and the generation of training data for this purpose. Based on such an evaluation, it can then be decided, for example, whether the transformation dataset or the underlying two map datasets are then used to determine the navigation information or not.

It shall be explained first how training data can be generated for this purpose and then how an evaluation algorithm can be trained or adapted on the basis of such training data. Then an application of the evaluation algorithm shall be explained.

According to an example embodiment of the present invention, the generation of training data or training datasets comprises the following steps for each of a plurality of training datasets:

Two input feature datasets are provided, which correspond to two map datasets or which have been determined on the basis of the two map datasets, as already mentioned above, for example. The two map datasets each comprise environmental information, wherein the environmental information has in each case been acquired from the mobile device and/or the environment by means of a sensor of the mobile device, as also already mentioned.

Furthermore, a transformation dataset is provided, which has been generated during an alignment of the two input feature datasets, wherein the transformation dataset comprises information about a transformative relation between the two input feature datasets, as also already mentioned. For example, the transformation dataset and the two input feature datasets can be saved appropriately after an alignment has been carried out.

Furthermore, a reference transformation dataset is provided as ground truth. Such a reference transformation dataset also comprises information about a transformative relation between the two input feature datasets. However, while the transformation dataset was obtained during the alignment process and is therefore ultimately an estimate, the reference transformation dataset indicates the actual transformative relation between the two input feature datasets, or it is at least known that this transformative relation corresponds sufficiently closely to reality. The reference transformation dataset can be obtained, for example, using a mobile device with additional high-precision sensors and then made available for later use, for example.

The transformation dataset and the reference transformation dataset can each comprise, for example, a rotation matrix and a translation vector.

The two input feature datasets, the transformation dataset and the reference transformation dataset, initially represent only raw data from which the training dataset is then to be formed. These raw data may also comprise optional, additional problem data or other information such as the initial point clouds (map datasets) or method-specific information such as point-to-point correspondences and their weighting.

A correlation dataset is then determined, namely on the basis of the two input feature datasets and/or the transformation dataset. The correlation dataset comprises information about a correlation between at least two of the following datasets: the two input feature datasets, the transformation dataset.

The correlation dataset can be a data vector, for example. The correlation dataset then indicates in particular a relationship between the feature datasets and/or the transformation dataset. However, it should be ensured in particular that the correlation dataset is not determined on the basis of the reference transformation dataset, since such a correlation dataset must also be determined later when applying the evaluation algorithm if there is no reference transformation dataset.

In general, the correlation dataset can be determined or derived using a feature generation selected by the user. In one embodiment, the correlation dataset comprises information about a correlation between the two input feature datasets, wherein the correlation comprises distances between a point of one of the two input feature datasets and a point of the other of the two input feature datasets that is closest to this point. A point is understood here in particular as a feature vector.

A concrete example is that for each point or feature vector in one of the two input feature datasets, the point or feature vector closest to this point in the other of the two input feature datasets is determined, namely with respect to a suitable norm, e.g., the Euclidean norm. In this way, a set M of distances between the corresponding points or feature vectors is obtained. A simple example of feature generation and the resulting data vector (correlation dataset) would then be, for example, $$\begin{pmatrix} 25\% \text{ quantile of } M \\ 50\% \text{ quantile of } M \\ 75\% \text{ quantile of } M \end{pmatrix}.$$

Furthermore, an accuracy of a match between the transformation dataset and the reference transformation dataset is determined. In addition, a quality measure is then determined depending on the accuracy of the match between the transformation dataset and the reference transformation dataset.

Here too, a norm, for example, can be determined between the transformation dataset and the reference transformation dataset, in particular one norm between the translation vector of the transformation dataset and the translation vector of the reference transformation dataset, and one norm between the rotation matrix of the transformation dataset and the rotation matrix of the reference transformation dataset; both values of the norms can then be added. The Euclidean norm or another norm, for example, can be used in this case too. For example, if the result, i.e., the sum of the two values of the norms, is less than a predefined threshold value, the accuracy can be assumed to be sufficient, and if the result is greater than the predefined threshold value, it can be assumed to be insufficiently accurate.

The quality measure can comprise one of multiple quality classes. For example, it is possible for only two quality classes to be provided, e.g., "sufficiently accurate" and "not sufficiently accurate," corresponding to the above example with the threshold value. However, it is also possible for more than two quality classes to be used, e.g., three quality classes: "low inaccuracy," "medium inaccuracy," "high inaccuracy;" for this purpose, two threshold values can then be specified, for example.

However, the quality measure can likewise comprise a continuous or quasi-continuous value, e.g., between zero and one. For this purpose, the mentioned result, i.e., the sum of the two values of the norm, can be normalized to a value between zero and one, for example. Likewise, the error of the transformation in a certain norm can be used as a quality measure, for example. It is then not a multi-class problem, but a regression problem.

The training dataset is then provided, wherein the training dataset comprises the correlation dataset and the quality measure.

According to an example embodiment of the present invention, to train the evaluation algorithm, a plurality of training datasets are then provided, which have been generated, for example, as explained above. Each training dataset therefore comprises a correlation dataset and a quality measure. The evaluation algorithm is then adapted or trained, namely on the basis of the plurality of training datasets; this is done in such a way that the evaluation algorithm determines an evaluation result for a target correlation dataset and a target transformation dataset, which evaluation result assigns a quality measure to the target transformation dataset. The adapted evaluation algorithm is then provided.

A suitable evaluation algorithm is in particular a classifier or classification algorithm, in which one of multiple classes or quality classes is therefore determined as a quality measure. For example, a suitable classification approach can be selected on the basis of given training data. A generic, suitable classifier accepts, for example, input data in the selected form and delivers as output a real number, a probability value for one of the classes or a binary value (0, 1). The classifier is trained on a set of labeled training data, i.e., the training datasets mentioned above. Concrete examples of possible classification mechanisms are support vector classifiers, logistic regression, gradient boosting classifiers, as well as neural networks or machine learning algorithms in general. Training can be done depending on the type of evaluation algorithm or classification algorithm and can comprise, for example, adjusting the weights of the individual neurons of a neural network. For example, a so-called loss function can be used, which is optimized.

A trained evaluation algorithm can then be used to evaluate an alignment of two map datasets. In this case, two input feature datasets are provided that correspond to two map datasets or that have been determined on the basis of the two map datasets and as the map datasets have already been described, i.e., the map datasets each comprise environmental information that has been acquired in each case from the mobile device and/or the environment by means of a sensor of the mobile device.

Furthermore, a transformation dataset is provided, which has been generated during an alignment of the two input feature datasets, wherein the transformation dataset comprises information about a transformative relation between the two input feature datasets.

It should be mentioned at this point that in the process, for example, the input feature datasets are determined from the obtained map datasets, to which input feature datasets the alignment is then applied, wherein the transformation dataset is then obtained. In general, however, the alignment itself may also have taken place elsewhere and at a different time.

On the basis of the two input feature datasets and/or the transformation dataset, a correlation dataset is then determined, which comprises information about a correlation between at least two of the following datasets: the two input feature datasets, the transformation dataset.

On the basis of the correlation dataset and the transformation dataset, an evaluation result is then determined using the evaluation algorithm, which evaluation result assigns a quality measure to the transformation dataset.

The evaluation result is then provided for use in determining the navigation information, in which navigation information is determined on the basis of the two map datasets and/or the transformation dataset depending on the evaluation result.

Determining the navigation information on the basis of the two map datasets and/or the transformation dataset depending on the evaluation result comprises, in one example embodiment of the present invention, using the two map datasets and/or the transformation data when determining the navigation information if the quality measure according to the evaluation result corresponds to a predefined quality criterion, and not using the two map datasets and/or the transformation data when determining the navigation information if the quality measure according to the evaluation result does not correspond to the predefined quality criterion.

However, the two map datasets and/or the transformation data may also be used to determine the navigation information with a weighting, wherein the weighting is determined depending on the quality measure according to the evaluation result.

Once training datasets have been created and a classifier or evaluation algorithm has been trained on them, it can be used in the process chain for map creation. For example, after FCGF-based scan matching has been carried out, feature generation can be applied to the output data (two input feature datasets and transformation dataset) first, and then the trained classifier or evaluation algorithm can be applied.

The output of the classifier or evaluation algorithm can then be used to reduce the influence of inaccurately aligned point cloud pairs.

Two example embodiments of the use of the classification result according to the present invention shall be briefly explained again below. During sorting, if the classifier outputs a high probability for a failed estimate or the label for a failed estimate, the corresponding point cloud pair can be excluded from further processing. The use of a weighting is considered for all classifiers, for example, not just a binary label (i.e., one of two classes). Here, an output can be transformed, for example, to probability values in the interval [0; 1]. A weighting factor can then be calculated from these probability values. The higher the probability of a failed/inaccurate transformation estimate, the smaller the weighting factor.

In all further process steps (e.g., pose graph optimization), the influence of point cloud pairs can then be controlled according to the weighting factor.

Thus, by classifying the scan matching result, the influence of inaccurate transformation estimates in the further processing steps is reduced. This ultimately leads to higher map quality.

A system according to the present invention for data processing or a computing unit, e.g., a control device or a control unit of a mobile device, or a server or other computer, is configured, in particular in terms of programming, to carry out a method according to the present invention, e.g., in one of the example embodiments.

The present invention also relates to a mobile device that has such a system for data processing or that is configured to obtain navigation information determined as described above. The mobile device also has a sensor for acquiring environmental information and is configured to navigate on the basis of the navigation information.

Furthermore, the implementation of a method according to the present invention in the form of a computer program or computer program product having program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, DVDs, and others. It is also possible to download a program via computer networks (Internet, intranet, etc.). Such a download can be wired or wireless (e.g., via a WLAN network or a 3G, 4G, 5G or 6G connection, etc.).

Further advantages and example embodiments of the present invention can be found in the description and the figures.

The present invention is illustrated schematically in the figures on the basis of an example embodiment and is described below with reference to the figures.

DETAILED DESCRIPTION OF EXAMPLE EMBODIMENTS

Figure 1:
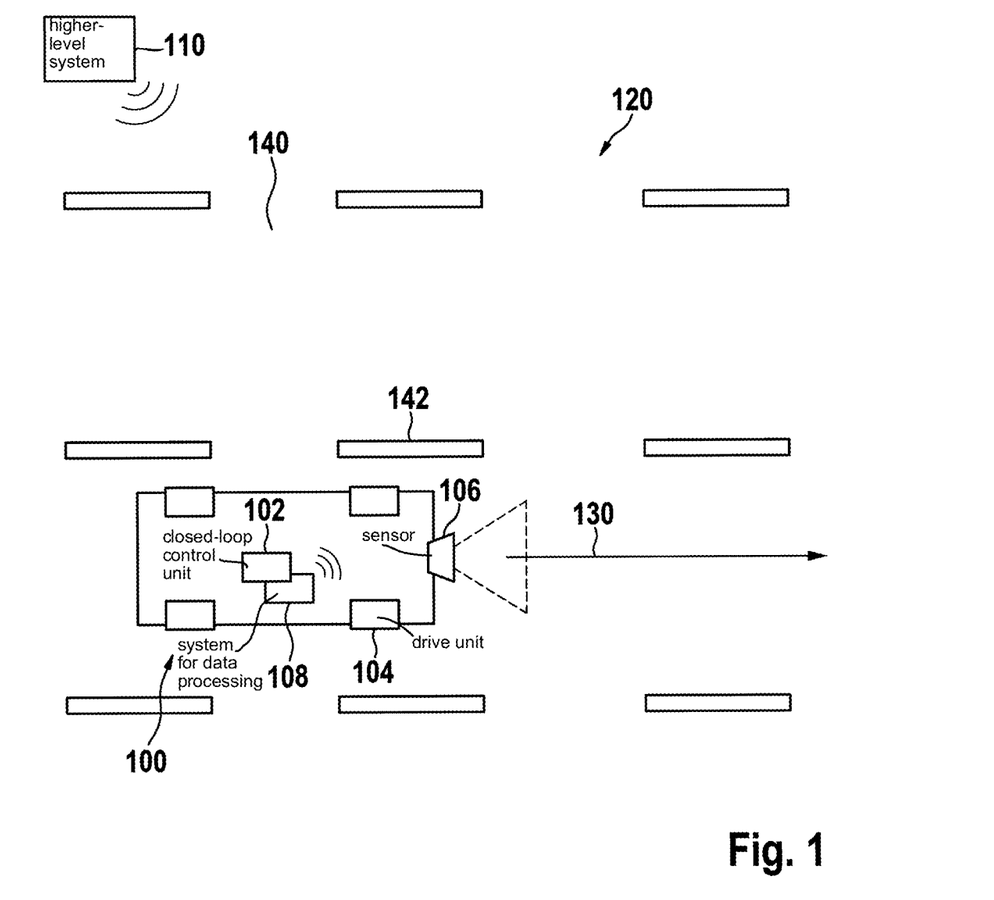
FIG. 1 schematically shows a mobile device in an environment to explain the present invention.

FIG. 1 shows a mobile device 100 in an environment 120 schematically and by way of example to explain the present invention. The environment 120 here comprises, by way of example, a road 140 with lane markings 142. The mobile device 100 is, by way of example, a vehicle with an open-loop or closed-loop control unit 102 and a drive unit 104 (with wheels) for moving the vehicle 100, e.g., along a movement path 130, which in this case runs, by way of example, along the road 140 or a lane of the road.

Furthermore, the vehicle 100 has, by way of example, a sensor 106 designed as a camera with a capture range. For better illustration, the capture range is chosen to be relatively small here; in practice, however, the capture range can also be up to 180°, for example. Further cameras and/or other sensors may also be provided. The environment 120 can be acquired by means of the sensor 106, i.e., images of the environment or environmental information in general can be generated or captured.

Furthermore, the vehicle 100 has a computing unit or a system 108 for data processing, e.g., a control unit, by means of which data can be exchanged with a higher-level system 110, e.g., via an indicated radio link. In the system 110, for example, movement paths (or navigation information in general) can be determined, which are then transmitted to the system 108 in the vehicle 100, which should then follow said movement paths. However, a movement path (or navigation information in general) may be determined in the system 108 itself or otherwise obtained there. Instead of a movement path or the navigation information, the system 108 can also obtain, for example, control information that has been determined on the basis of a movement path or the navigation information and according to which the open-loop or closed-loop control unit 102 can move the vehicle 100 via the drive unit 104 in order to follow a movement path. The movement path 130 is indicated here only by way of example.

To determine the navigation information mentioned, the images captured by the camera 106—or generally map datasets, in particular in the case of other types of sensors—can be used. For example, an image may comprise or depict the lane markings or their positions, while other information in the image is disregarded. In particular, a map dataset can then be present as a point cloud, i.e., as a set of points that indicate the lane markings or their positions.

Figure 2A:
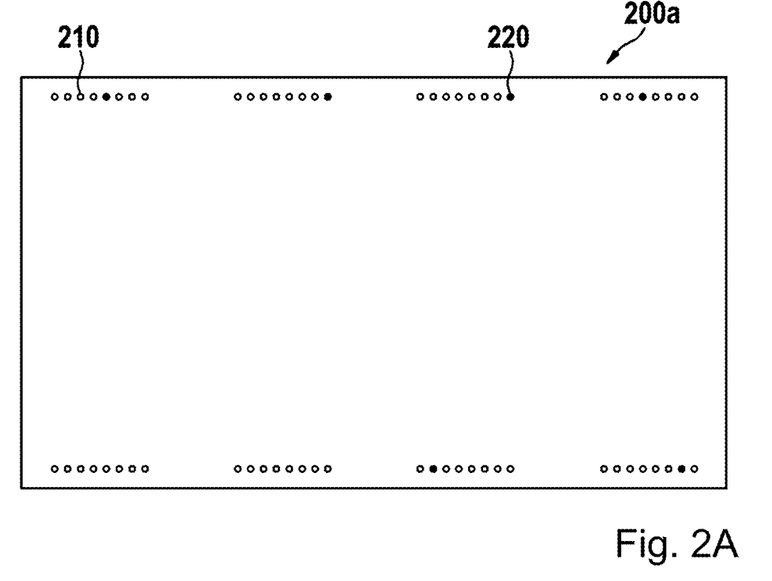
FIG. 2A, 2B schematically show alignments of map datasets to explain the present invention.
Figure 2B:
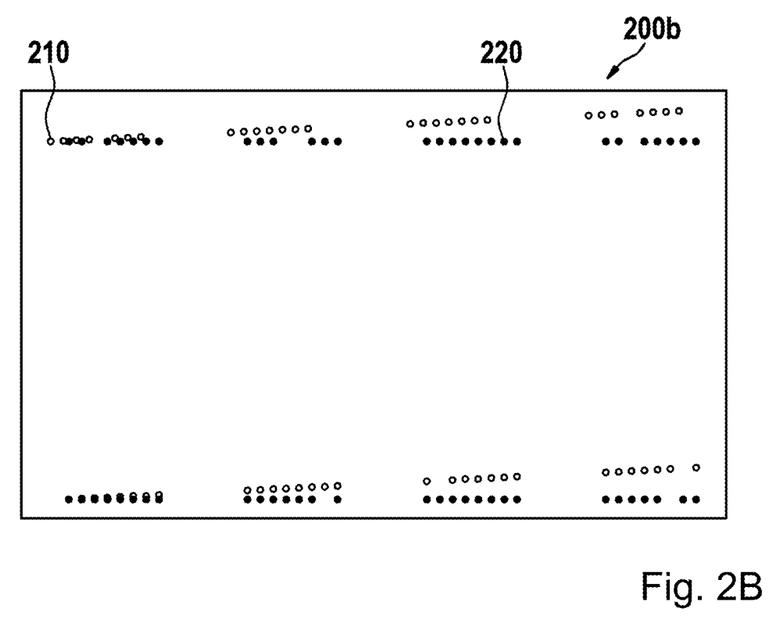

FIGS. 2A and 2B each schematically show two such map datasets or images for explanation. These map datasets or images may, for example, have been captured by the camera of the vehicle in FIG. 1. Both map datasets 210, 220 each comprise a point cloud that indicates lane markings or their positions, as shown in FIG. 1, for example.

For the navigation of the vehicle, the two map datasets 210 and 220 are now to be aligned, i.e., matched, to find a transformative relation (or transformation) that maps one map dataset onto the other map dataset. Such an alignment is indicated by 200a and 200b respectively. This transformative relation then represents a movement of the vehicle between the points in time at which the two map datasets or images were captured. This applies in particular if multiple observations come from one vehicle. If mapping and localization are decoupled, it can be spatially the same or a similar observation made at very different points in time by multiple vehicles.

At this point it should be mentioned that the two images or map datasets are shown only by way of example and for explanation purposes. Instead of two images, an image and an existing map can also be aligned, with the map itself again being based on images. After the alignment, the new image can then be used to expand the map. In this case, one of the map datasets would be the map, while the other of the map datasets would be a (new) image.

As already mentioned, such an alignment can be good or less good. The alignment 200a in FIG. 2A—here the point clouds or map datasets lie very well on top of each other—is a good alignment, whereas the alignment 200b in FIG. 2B—here there is an offset between the point clouds or map datasets—is a less good alignment.

If a transformative relation (or transformation) obtained during the alignment 200b—generally a transformation dataset—is used for navigation, this can lead to problems, and navigation can be poor. One possibility of evaluating the quality of such an alignment is presented below.

Figure 3:
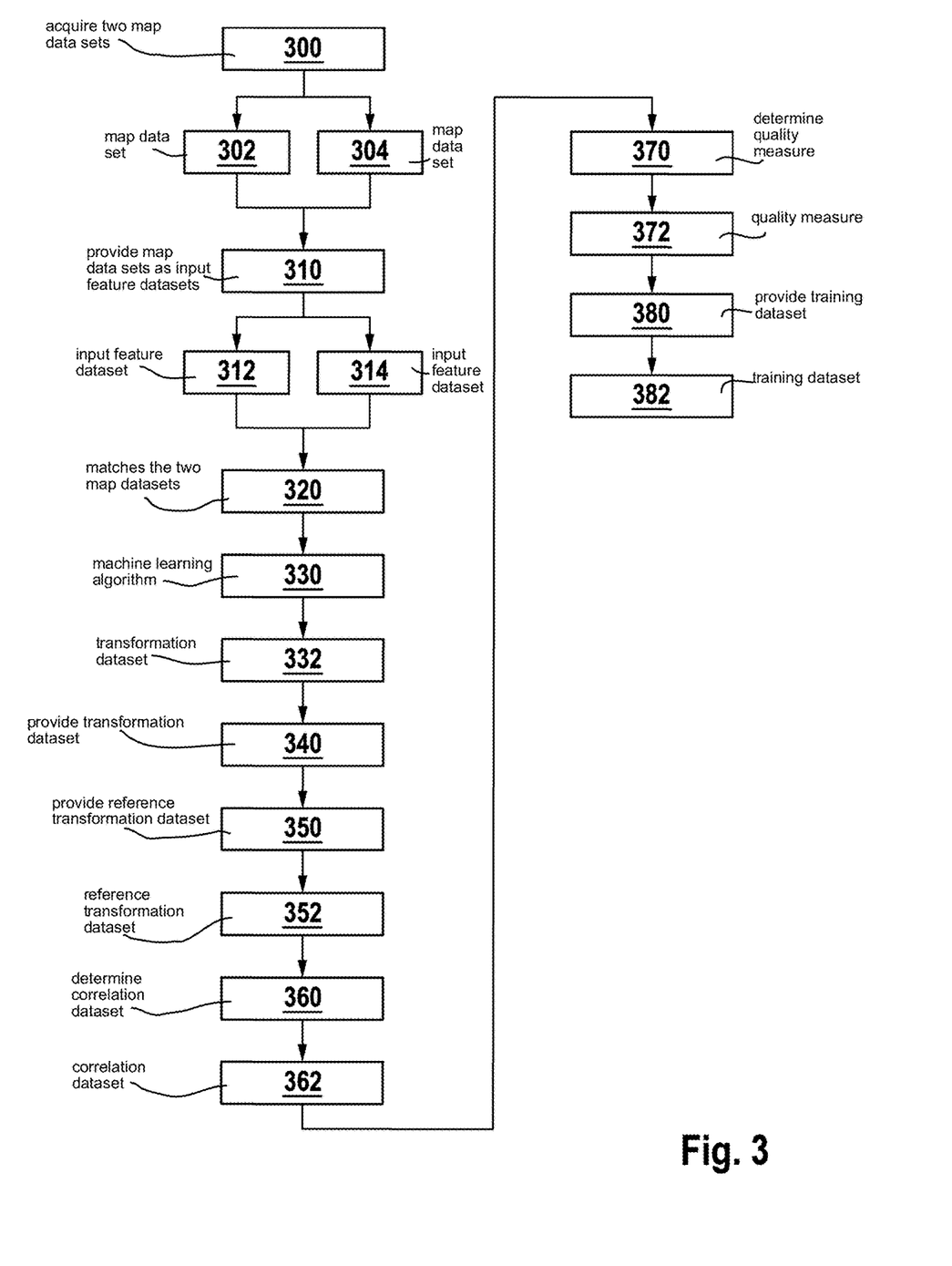
FIG. 3 schematically shows a sequence of a method in one example embodiment of the present invention.

FIG. 3 schematically shows a sequence of a method in one embodiment, namely for generating training datasets. In a step 300, two map datasets 302, 304, each with environmental information, are acquired, namely in each case from the mobile device and/or the environment by means of a sensor of the mobile device.

In a step 310, the two map datasets are provided as input feature datasets 312, 314. It is also possible that the input feature data are determined on the basis of the two map datasets. As already mentioned above, feature descriptors can be extracted here, for example. The input feature datasets represent, for example, input data for a machine learning algorithm for alignment.

In a step 320, the alignment, i.e., a matching, of the two map datasets is then carried out. This is done, for example, using a machine learning algorithm 330, e.g., a CNN. In the process, a transformation dataset 332 is obtained, which comprises information about a transformative relation between the two map datasets or input feature datasets. The transformation dataset 332 is then also provided, in step 340. Furthermore, in step 350, a reference transformation dataset 352 is provided as ground truth.

On the basis of the two input feature datasets and/or the transformation dataset, a correlation dataset 362 is then determined in step 360, wherein the correlation dataset comprises information about a correlation between at least two of the following datasets: the two input feature datasets, the transformation dataset. For example, the correlation may comprise distances between a point of one of the two input feature datasets and a point of the other of the two input feature datasets that is closest to this point.

Furthermore, in step 370, a quality measure 372 is then determined depending on an accuracy of a match between the transformation dataset 332 and the reference transformation dataset 352. As mentioned, such a quality measure can, for example, comprise one of multiple quality classes, or a continuous or quasi-continuous value.

In step 380, a training dataset 382 is then provided, wherein the training dataset comprises the correlation dataset 362 and the quality measure 372.

These steps can be repeated or, if necessary, carried out multiple times at least partially in parallel, in order to obtain a plurality of training datasets.

It should be mentioned that the alignment was also carried out independently and, for example, as part of an earlier navigation of the mobile device, and therefore ultimately only steps 310 and 340 are required insofar as they provide the two input feature datasets and the transformation dataset.

Figure 4:
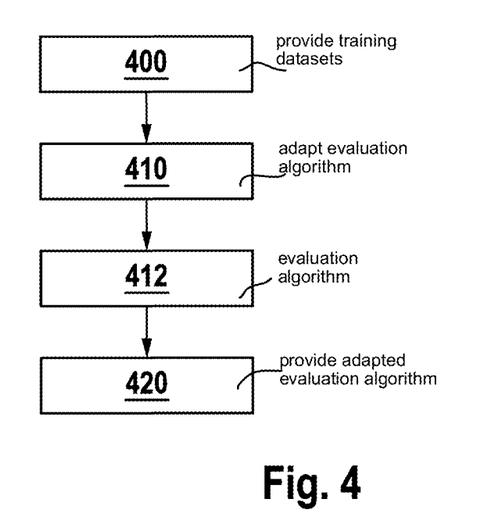
FIG. 4 schematically shows a sequence of a method in a further example embodiment of the present invention.

FIG. 4 schematically shows a sequence of a method in a further embodiment, namely for training the evaluation algorithm by means of which an alignment of two map datasets is evaluated.

For this purpose, in step 400, the training datasets mentioned in relation to step 380 according to FIG. 3, for example, are provided in a plurality. Thus, each training dataset 380 correspondingly comprises a correlation dataset 362 and a quality measure 372.

In a step 410, the evaluation algorithm 412 is then adapted or trained on the basis of the plurality of training datasets, namely in such a way that the evaluation algorithm determines an evaluation result for a target correlation dataset and a target transformation dataset, which evaluation result assigns a quality measure to the target transformation dataset. In step 420, the evaluation algorithm adapted or trained in this way is then provided.

Figure 5:
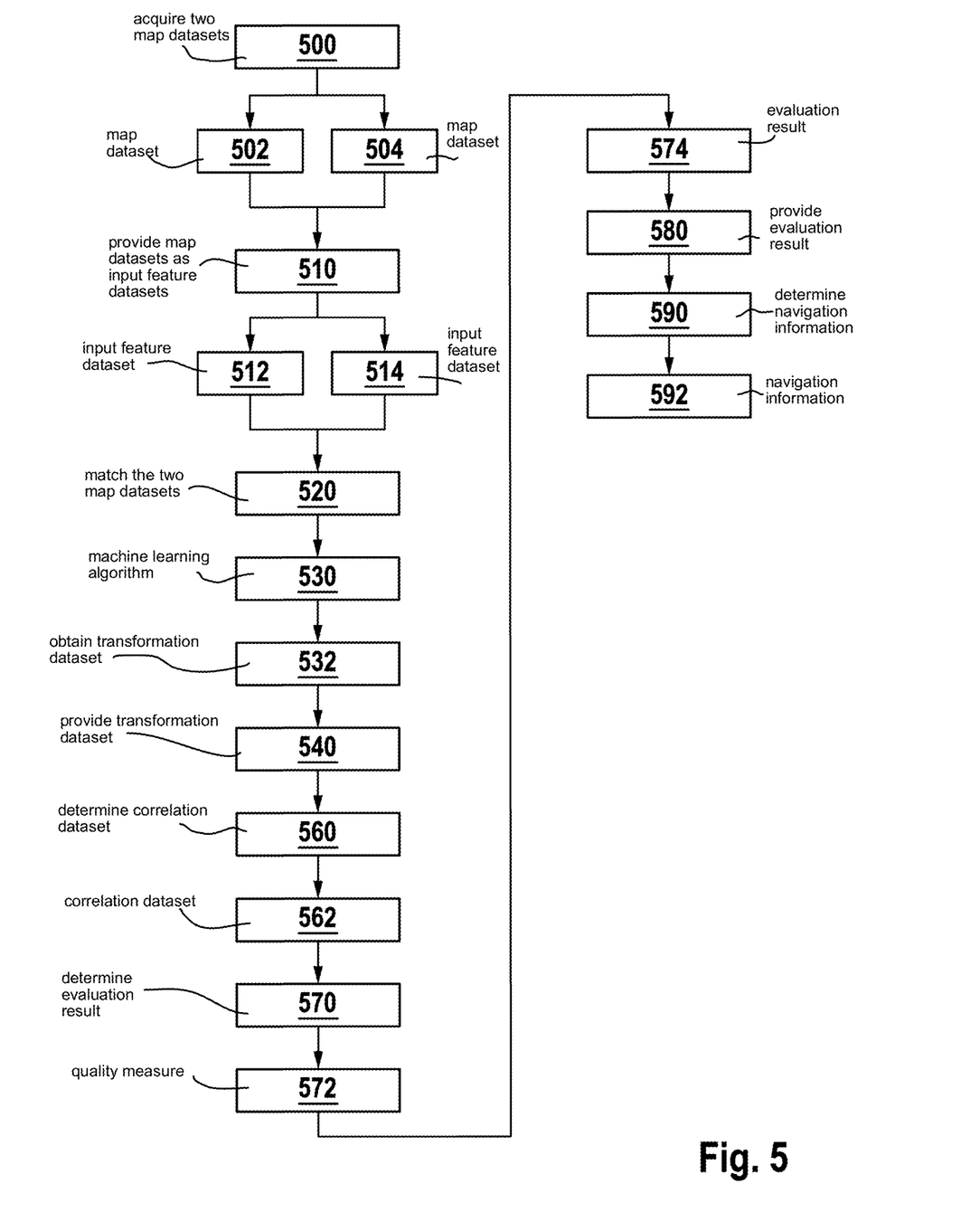
FIG. 5 schematically shows a sequence of a method in a further example embodiment of the present invention.

FIG. 5 schematically shows a sequence of a method in a further embodiment, namely for evaluating an alignment of two map datasets by means of an evaluation algorithm that has been adapted or trained as explained with reference to FIG. 4, for example.

For this purpose, in step 500, two map datasets 502, 504, each with environmental information, are acquired, namely in each case from the mobile device and/or the environment by means of a sensor of the mobile device.

In a step 510, the two map datasets are provided as input feature datasets 512, 514. It is also possible that the input feature data are determined on the basis of the two map datasets. As already mentioned above, feature descriptors can be extracted here, for example. The input feature datasets represent, for example, input data for a machine learning algorithm for alignment.

In a step 520, the alignment, i.e., a matching, of the two map datasets is then carried out. This is done, for example, using a machine learning algorithm 530, e.g., a CNN. In the process, a transformation dataset 532 is obtained, which comprises information about a transformative relation between the two map datasets or input feature datasets. The transformation dataset 532 is then also provided in step 540.

On the basis of the two input feature datasets and/or the transformation dataset, a correlation dataset 562 is then determined in step 560, wherein the correlation dataset comprises information about a correlation between at least two of the following datasets: the two input feature datasets, the transformation dataset. For example, the correlation may comprise distances between a point of one of the two input feature datasets and a point of the other of the two input feature datasets that is closest to this point.

Furthermore, in step 570, an evaluation result 574 will then be determined on the basis of the correlation dataset 562 and the transformation dataset 532 and using an evaluation algorithm, e.g., 412 according to FIG. 4, which evaluation result assigns a quality measure 572 to the transformation dataset. The quality measure 572 can be of the same type as the quality measure 372 with which the evaluation algorithm 412 was trained. For example, the quality measure can be determined first, which is then provided as the evaluation result 574 in step 580.

In a step 590, navigation information 592 for the navigation of the mobile device can then be determined on the basis of the map datasets and/or the transformation dataset and depending on the evaluation result 574, so that the mobile device can navigate. This can be the case, for example, if the quality measure according to the evaluation result corresponds to a predefined quality criterion. If the quality measure does not correspond to the predefined quality criterion, e.g., if it indicates a poor alignment or transformation estimate, the determination of the navigation information, in any case on the basis of the current map datasets and/or the current transformation dataset, can be omitted.

The invention claimed is:

1. A method for generating training datasets for training an evaluation algorithm using which an alignment of two map datasets can be evaluated in order to determine navigation information for a mobile device that is moving or is to move in an environment, the method comprising:
for each of a plurality of training datasets:
providing two input feature datasets, which correspond to two map datasets or which have been determined based on the two map datasets, wherein the two map datasets each include environmental information, wherein the environmental information has, in each case, been acquired from the mobile device and/or from the environment using a sensor of the mobile device;
providing a transformation dataset, wherein the transformation dataset has been generated during an alignment of the two input feature datasets, and wherein the transformation dataset includes information about a transformative relation between the two input feature datasets;
providing a reference transformation dataset as ground truth;
determining a correlation dataset based on the two input feature datasets and/or the transformation dataset, wherein the correlation dataset includes information about a correlation between at least two of the following datasets: the two input feature datasets, the transformation dataset;
determining a quality measure depending on an accuracy of a match between the transformation dataset and the reference transformation dataset; and
providing the training dataset, wherein the training dataset includes the correlation dataset and the quality measure.

2. The method according to claim 1, wherein:
(i) the quality measure includes one of multiple quality classes, or
(ii) the quality measure includes a continuous or quasi-continuous value.

3. The method according to claim 1, wherein:
the correlation dataset includes information about a correlation between the two input feature datasets;
the correlation includes distances between a point of one of the two input feature datasets and a point of the other of the two input feature datasets that is closest to the point.

4. A method for training an evaluation algorithm using which an alignment of two map datasets can be evaluated in order to determine navigation information for a mobile device that is moving or is to move in an environment, the method comprising:
providing a plurality of training datasets, wherein each of the training datasets includes:
a correlation dataset that has been determined based on two input feature datasets and/or a transformation dataset and that includes information about a correlation between at least two of the following datasets: the two input feature datasets and the transformation dataset, wherein:
the two input feature datasets correspond to two map datasets or have been determined based on the two map datasets, wherein the two map datasets each include environmental information, wherein the environmental information has in each case been acquired from the mobile device and/or the environment using a sensor of the mobile device, and
the transformation dataset has been generated during an alignment of the two input feature datasets, and wherein the transformation dataset includes information about a transformative relation between the two input feature datasets, and
a quality measure that indicates an accuracy of a match between the transformation dataset and a reference transformation dataset;
adapting the evaluation algorithm based on the plurality of training datasets such that the evaluation algorithm determines an evaluation result for a target correlation dataset and a target transformation dataset, which evaluation result assigns a quality measure to the target transformation dataset; and providing the adapted evaluation algorithm.

5. The method according to claim 4, wherein the plurality of training datasets have been determined by:

for each of the plurality of training datasets:

providing the two input feature datasets, which correspond to the two map datasets or which have been determined based on the two map datasets, wherein the two map datasets each include environmental information, wherein the environmental information has, in each case, been acquired from the mobile device and/or from the environment using a sensor of the mobile device;

providing a transformation dataset, wherein the transformation dataset has been generated during an alignment of the two input feature datasets, and wherein the transformation dataset includes information about a transformative relation between the two input feature datasets;

providing the reference transformation dataset as ground truth;

determining the correlation dataset based on the two input feature datasets and/or the transformation dataset, wherein the correlation dataset includes information about the correlation between at least two of the following datasets: the two input feature datasets, the transformation dataset;

determining the quality measure depending on the accuracy of the match between the transformation dataset and the reference transformation dataset; and providing the training dataset, wherein the training dataset includes the correlation dataset and the quality measure.

6. A method for evaluating an alignment of two map datasets to determine navigation information for a mobile device that is moving or is to move in an environment, comprising the following steps:

providing two input feature datasets, which correspond to two map datasets or which have been determined based on the two map datasets, wherein the two map datasets each include environmental information, wherein the environmental information has in each case been acquired from the mobile device and/or from the environment using a sensor of the mobile device;

providing a transformation dataset, wherein the transformation dataset has been generated during an alignment of the two input feature datasets, and wherein the transformation dataset includes information about a transformative relation between the two input feature datasets;

determining a correlation dataset based on the two input feature datasets and/or the transformation dataset, wherein the correlation dataset includes information about a correlation between at least two of the following datasets: the two input feature datasets, the transformation dataset;

determining an evaluation result based on the correlation dataset and the transformation dataset and using an evaluation algorithm, the evaluation result assigning a quality measure to the transformation dataset; and providing the evaluation result for use in determining the navigation information, in which the navigation information is determined based on the two map datasets and/or the transformation dataset depending on the evaluation result.

7. The method according to claim 6, wherein the determining of the navigation information based on the two map datasets and/or the transformation dataset depending on the evaluation result includes:

(i) using the two map datasets and/or the transformation data when determining the navigation information when the quality measure according to the evaluation result corresponds to a predefined quality criterion, and not using the two map datasets and/or the transformation data when determining the navigation information when the quality measure according to the evaluation result does not correspond to the predefined quality criterion, or (ii) using the two map datasets and/or the transformation dataset to determine the navigation information with a weighting, wherein the weighting is determined depending on the quality measure according to the evaluation result.

8. The method according to claim 6, further comprising:

determining the navigation information based on the map datasets and/or the transformation dataset, depending on the evaluation result, wherein the navigation information includes a map of the environment and/or a trajectory for the mobile device.

9. The method according to claim 1, wherein the sensor of the mobile device includes one of the following sensors: a camera, a radar sensor, a lidar sensor, an ultrasonic sensor.

10. The method according to claim 1, wherein the two map datasets are present as point clouds or represent point clouds.

11. A system for data processing, the comprising comprising an arrangement configured to generate training datasets for training an evaluation algorithm using which an alignment of two map datasets can be evaluated in order to determine navigation information for a mobile device that is moving or is to move in an environment, the system configured to:

for each of a plurality of training datasets:

provide two input feature datasets, which correspond to two map datasets or which have been determined based on the two map datasets, wherein the two map datasets each include environmental information, wherein the environmental information has, in each case, been acquired from the mobile device and/or from the environment using a sensor of the mobile device;

provide a transformation dataset, wherein the transformation dataset has been generated during an alignment of the two input feature datasets, and wherein the transformation dataset includes information about a transformative relation between the two input feature datasets;

provide a reference transformation dataset as ground truth;

determine a correlation dataset based on the two input feature datasets and/or the transformation dataset, wherein the correlation dataset includes information about a correlation between at least two of the following datasets: the two input feature datasets, the transformation dataset;

determine a quality measure depending on an accuracy of a match between the transformation dataset and the reference transformation dataset; and provide the training dataset, wherein the training dataset includes the correlation dataset and the quality measure.

12. A mobile device configured to obtain navigation information by:
- providing two input feature datasets, which correspond to two map datasets or which have been determined based on the two map datasets, wherein the two map datasets each include environmental information, wherein the environmental information has in each case been acquired from the mobile device and/or from the environment using a sensor of the mobile device;
- providing a transformation dataset, wherein the transformation dataset has been generated during an alignment of the two input feature datasets, and wherein the transformation dataset includes information about a transformative relation between the two input feature datasets;
- determining a correlation dataset based on the two input feature datasets and/or the transformation dataset, wherein the correlation dataset includes information about a correlation between at least two of the following datasets: the two input feature datasets, the transformation dataset;
- determining an evaluation result based on the correlation dataset and the transformation dataset and using an evaluation algorithm, the evaluation result assigning a quality measure to the transformation dataset; and
- providing the evaluation result for use in determining the navigation information, in which the navigation information is determined based on the two map datasets and/or the transformation dataset depending on the evaluation result;
- wherein the mobile device has a sensor for acquiring environmental information and is configured to navigate based on the navigation information using an open-loop or closed-loop control unit and a drive unit for moving the mobile device according to the navigation information.

13. The mobile device according to claim 12, wherein:
(i) the mobile device is a vehicle that moves in an at least partially automated manner, the vehicle being a passenger transport vehicle or a goods transport vehicle; and/or
(ii) the mobile device is a robot including a household robot; and/or
(iii) the mobile device is a drone.

14. A non-transitory computer-readable storage medium on which is stored a computer program for evaluating an alignment of two map datasets to determine navigation information for a mobile device that is moving or is to move in an environment, the computer program, when executed by a computer, causing the computer to perform the following steps:
- providing two input feature datasets, which correspond to two map datasets or which have been determined based on the two map datasets, wherein the two map datasets each include environmental information, wherein the environmental information has in each case been acquired from the mobile device and/or from the environment using a sensor of the mobile device;
- providing a transformation dataset, wherein the transformation dataset has been generated during an alignment of the two input feature datasets, and wherein the transformation dataset includes information about a transformative relation between the two input feature datasets;
- determining a correlation dataset based on the two input feature datasets and/or the transformation dataset, wherein the correlation dataset includes information about a correlation between at least two of the following datasets: the two input feature datasets, the transformation dataset;
- determining an evaluation result based on the correlation dataset and the transformation dataset and using an evaluation algorithm, the evaluation result assigning a quality measure to the transformation dataset; and
- providing the evaluation result for use in determining the navigation information, in which the navigation information is determined based on the two map datasets and/or the transformation dataset depending on the evaluation result.

* * * * *